United States Patent
Sutherland (10) Patent No.: US 9,032,831 B2
(45) Date of Patent: May 19, 2015

(54) DELTA ROBOT WITH OMNI WHEELED BASE

(75) Inventor: Stephen Sutherland, Markham (CA)

(73) Assignee: CrossWing Inc., Markham, ON (CA)

( * ) Notice: Subject to any disclaimer, the term of this patent is extended or adjusted under 35 U.S.C. 154(b) by 0 days.

(21) Appl. No.: 14/005,695

(22) PCT Filed: Mar. 15, 2012

(86) PCT No.: PCT/CA2012/000235
§ 371 (c)(1),
(2), (4) Date: Dec. 6, 2013

(87) PCT Pub. No.: WO2012/122633
PCT Pub. Date: Sep. 20, 2012

(65) Prior Publication Data
US 2014/0083231 A1    Mar. 27, 2014

(30) Foreign Application Priority Data
Mar. 17, 2011 (CA) .................................... 2734318

(51) Int. Cl.
*B25J 5/00*  (2006.01)
*B25J 9/00*  (2006.01)

(52) U.S. Cl.
CPC .. *B25J 5/00* (2013.01); *B25J 5/007* (2013.01); *B25J 9/0051* (2013.01); *B25J 9/0087* (2013.01)

(58) Field of Classification Search
CPC ........ B25J 9/0051; B25J 5/007; B25J 9/0087; B25J 5/00
USPC ............................ 180/7.1; 74/490.01, 490.05
See application file for complete search history.

(56) References Cited

U.S. PATENT DOCUMENTS

| | | | |
|---|---|---|---|
| 6,729,202 B2 * | 5/2004 | Gosselin et al. ........... | 74/490.05 |
| 2012/0103124 A1 * | 5/2012 | Herder et al. .............. | 74/490.01 |
| 2012/0266713 A1 * | 10/2012 | Feng .......................... | 74/490.05 |

* cited by examiner

*Primary Examiner* — Kevin Hurley (57) ABSTRACT

A modified delta linkage robot uses a reverse orientation arm linkage that includes an inwardly direct lower arm. This reverse arm orientation provides a number of advantages with respect to access over an extending surface such as may occur in a home, office or other environments shared with people. The delta linkage may also have application in certain factory environments, particularly when combined with an omni wheeled base. The linkage and the preferred linkage and omni wheeled base provide a stable movable platform. In addition this combination can advantageously include a number of sensors to take active steps to discourage and/or reduce the effect of sudden forces applied thereto.

17 Claims, 12 Drawing Sheets

DELTA ROBOT WITH OMNI WHEELED BASE

FIELD OF THE INVENTION

The present invention relates to robotic devices and in particular to robotic devices that use a delta type linkage.

BACKGROUND OF THE INVENTION

Delta type robots are known for use in association with many industrial applications to automate certain functions that have been previously carried out manually. In particular these delta robots have been suspended over a conveyor type system to grasp and move small objects rapidly and with a high rate of precision. The linkages of the delta robot hang downwardly and move a mounting plate and support a tool or other device to carry out a particular function or task.

Examples of such industrial robots are shown in U.S. Pat. No. 6,766,711 and US Published Application 2006/00182602.

These designs include an upper mounting base plate having three arm linkages pivotally secured thereto and each arm linkage includes first and second arms pivotally secured to each other. These arm linkages allow precision controlled movement of the mounting plate by means of motors provided at the base plate.

There have also been a number of variations of the delta type robot, for example, a counter balanced arrangement is shown in International Application WO 2010/128849. A further design that allows rotation of the mounting plate is shown in US Publication 2008/00262653.

The above identified delta robotic designs all include a base plate where the lower arm of each arm linkage is only pivotally secured to the base and the upper arm is a parallelogram type linkage that is pivotally secured in a manner to provide a further degree of movement to the lower arm. With this arrangement, the upper arm can pivot relative to the lower arm and it can also pivot in a second direction due to the parallelogram type linkage. With the known delta type robots in a neutral position of the arm linkages, each lower arm extends outwardly away from the base such that the pivot point with the upper arm is exterior to the base and exterior to the pivot position of the related lower arm on the base.

The present invention departs from this accepted configuration and uses a modified arm linkage arrangement for a delta robot. In a preferred embodiment, this modified arm linkage is advantageously used on a mobile base. This structure, when used on a mobile base, has a number of advantages with respect to reaching over surfaces such as a table edge and enhancing stability. The combined mobile base and linkage also preferably includes both an anticipatory and a responsive action to undesirable forces that may be suddenly applied to the robot to reduce the effect thereof.

SUMMARY OF THE INVENTION

A delta-type robot according to the present invention comprises a base, a movable top plate for receiving additional equipment to be selectively moved to different elevations and horizontal positions above the base, and includes three control arm linkages connecting the base to the movable top plate. Each control arm linkage includes a lower arm having a pivot connection with an upper arm and each lower arm section is pivotally secured to the base. Each upper arm section is pivotally secured to the movable top plate.

Two of the control arm linkages have a conventional orientation with the respective pivot connection of the lower and upper arms being located outwardly of the respective pivot securement of the lower arm with the base when the movable plate is in one of a host of positions generally above the base.

The remaining arm has a reverse orientation with the lower arm extending inwardly into the space above the base with the pivot connection with the upper arm being above the base with the movable plate in one of a host of positions generally above the base.

A delta-type robot of the present invention comprises a base and a movable top plate for receiving additional equipment to be selectively moved to different positions above and beyond the base. Three control arm linkages connect the base to the movable top plate where each control arm linkage includes a lower arm having a pivot connection with an upper arm. Each lower arm is pivotally secured to the base and each upper arm is pivotally secured to the movable top plate. Two of the control arm linkages have an outward orientation with the lower arms extending outwardly away from the respective pivot connection of the lower arm and the base when the movable top plate is generally centered above the base.

The remaining control arm has a reverse orientation with the lower arm section extending inwardly into the space above the base when the movable top plate is generally centered above the base.

In an aspect of the invention the lower arm of the control arm linkage having the reverse orientation is a fixed pivotal arm movable about a pivotal connection with the base.

In a further aspect of the invention, the two control arm linkages having an outward orientation each include a further pivot axis perpendicular to the pivot axis securing the lower arm to the base.

In an aspect of the invention the lower arm of each control arm linkage having an outward orientation includes two spaced parallel arm sections forming part of a parallelogram linkage.

According to an aspect of the invention the control arm linkage of the reverse orientation includes an upper arm having two spaced parallel arm sections pivotally secured to additionally provide pivoting movement in the plane of the two spaced parallel arm sections and forming part of a parallelogram linkage.

In yet a further aspect of the invention the base is a movable base, preferably of an omni-wheeled design.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
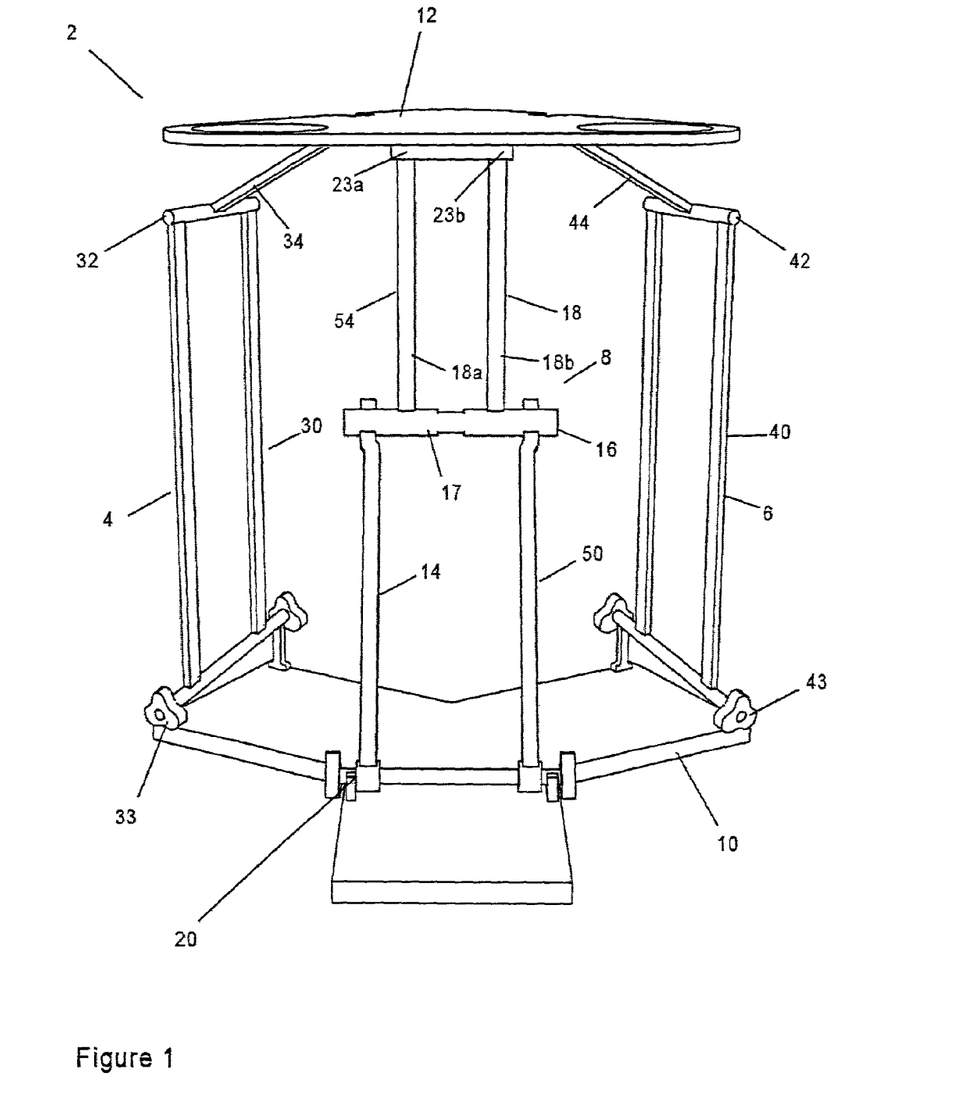
FIG. 1 is a perspective view of a delta type robot linkage with one of the pivoting arms having a reverse orientation.
Figure 2:
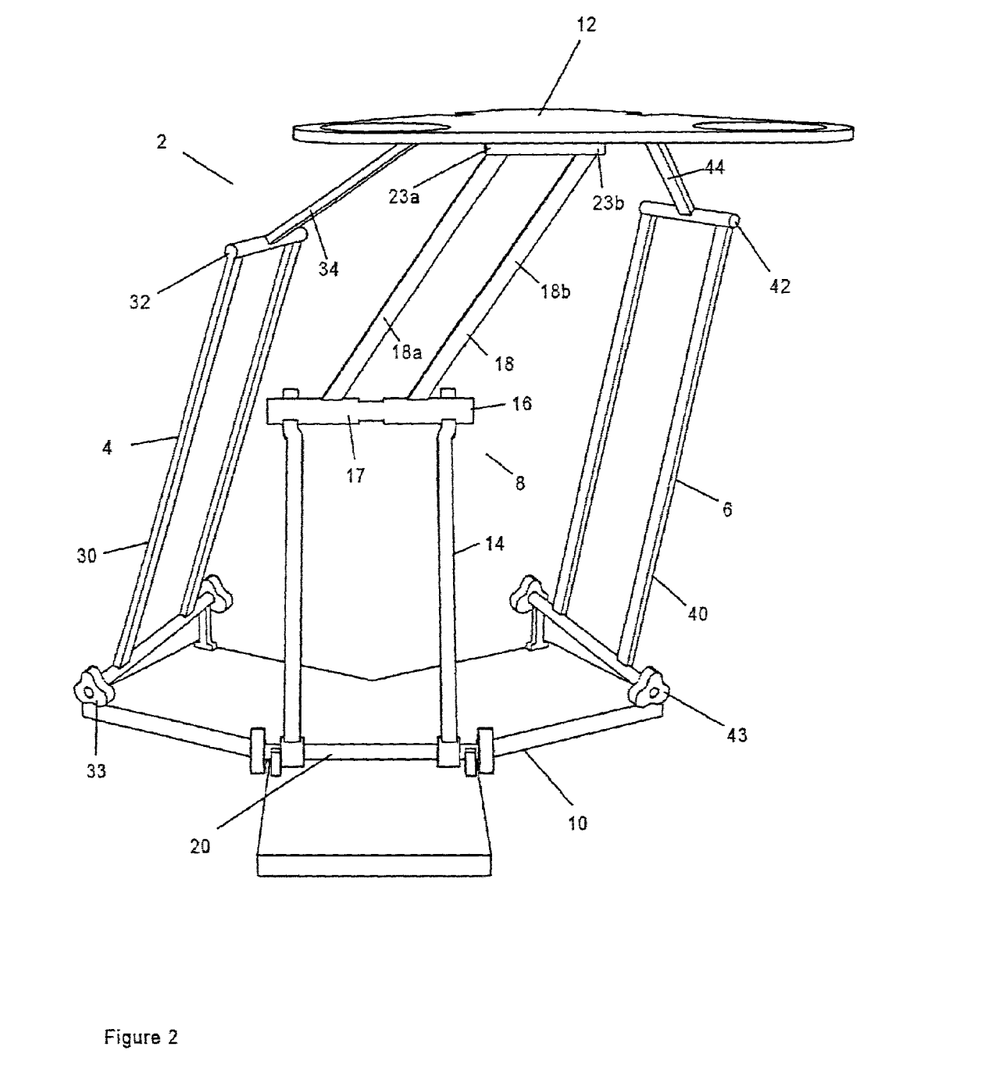
FIG. 2 is a perspective view of the modified delta linkage showing a particular movement of the mounting plate to one side of the base plate.

The modified delta type robot linkage 2 shown in FIG. 1 includes three pivotally secured arm linkages 4, 6 and 8 which connect the base 10 to the top plate 12. The arm linkage 8 has a reverse orientation in that the lower arm 14 extends inwardly over the base and has a pivot connection 16 with the upper arm 18 at a position inwardly of the pivot location 20 of the lower arm to the base (normal position of linkage). The lower arm 14 of arm linkage 8 has a pivot connection 20 with the base 10 and a pivot connection 16 with the upper arm 18. The upper arm 18 is a parallelogram type linkage to provide a further degree of movement of the top plate 12. Basically the arm member 18*a* is pivotally connected to the pivot shaft 17 and similarly arm section 18*b* is pivotally secured to the pivot shaft 17. The arm sections 18*a* and 18*b* are pivotally secured at 23*a* and 23*b* to the mounting plate 12 for the dual rotation of the parallelogram linkage movement of the arm members 18*a* and 18*b*. Arm linkages 4 and 6 have the traditional outward orientation of the lower arm 30 of arm linkage 4 and lower arm 40 of arm linkage 6 as the pivot location 32 of the lower arm 30 with the upper arm 34 is generally outwardly of the base when the top plate is generally centered above the base. With respect to arm linkage 6, the lower arm 40 has a pivot connection 42 with the upper arm 44, and again the pivot location 42 is generally outwardly of the base in a centered position of the top plate 12. Lower arm 30 is pivotally secured at 33 to the base 10 and lower arm 40 is pivotally secured at 43 to the base 10.

Arm linkages 4 and 6 have a modified orientation as the lower arms 30 and 40 define a parallelogram linkage and include the additional movement in the plane of the parallelogram linkage. This is in contrast to a conventional design where the lower arms (adjacent the base) are rigid arms having a single pivot axis and the upper arm is of a parallelogram linkage configuration.

As shown in FIG. 1, the length of the lower arm 50 of arm linkage 8 is much shorter in length than the lower arms 30 and 40 of arm linkages 4 and 6. The upper arm 4 is pivotally secured at 16 to the lower arm 50 and is of a length much greater than the upper arms 34, 44 of arm linkages 4 and 6.

Figure 3:
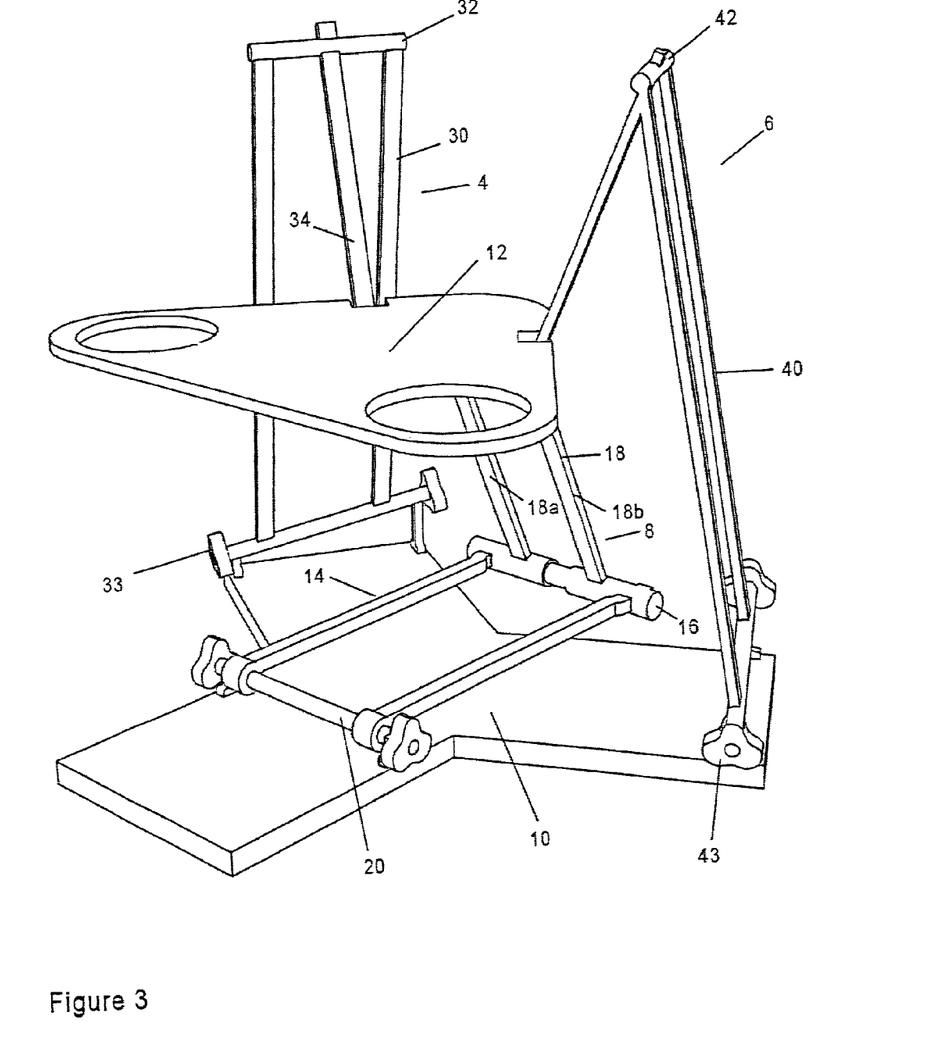
FIG. 3 is a further perspective view of the delta linkage illustrating a lower position of the mounting plate and a clear space below the mounting plate to advantageously increase the reach thereof over a projecting edge.
Figure 4:
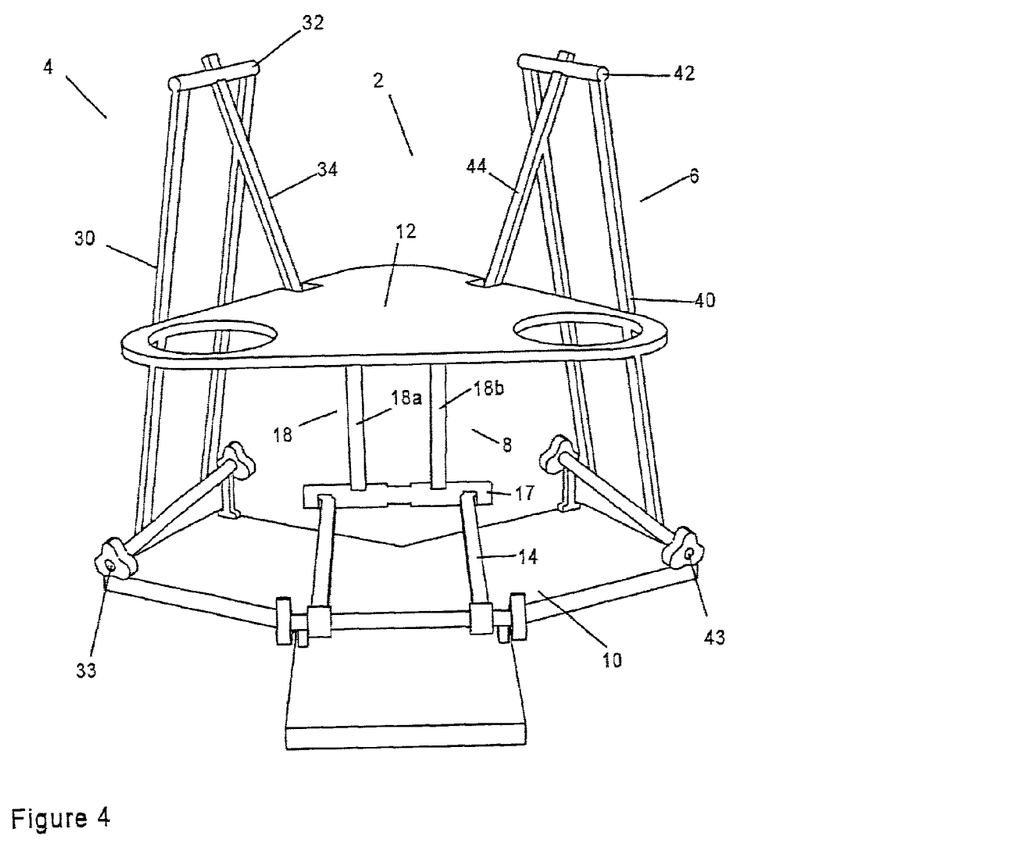
FIG. 4 is a perspective view of the modified delta linkage in a view similar to FIG. 3 with the mounting plate moved to one side of the center of the base.
Figure 5:
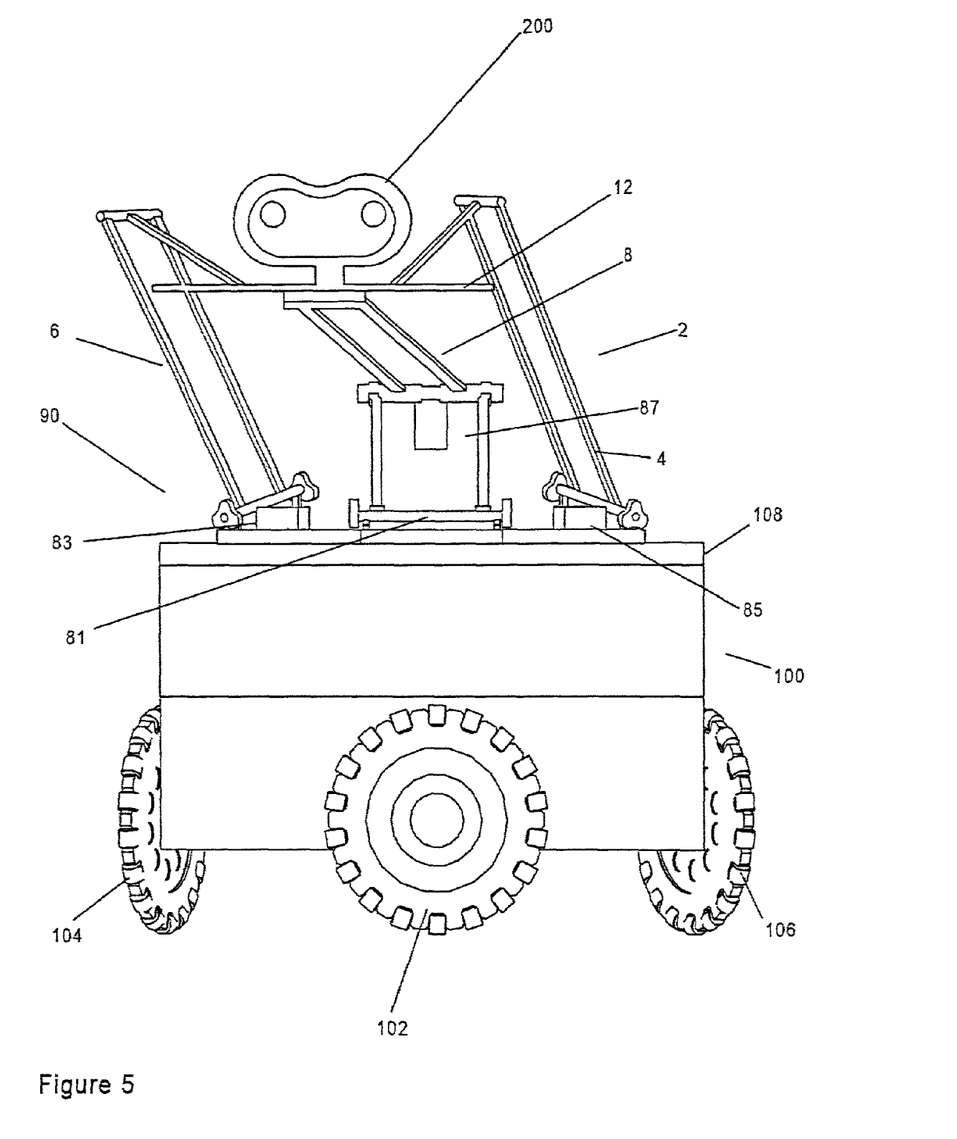
FIG. 5 is a front view of the delta type linkage robot in combination with an omni wheeled base.

The modifications of the lower arms and the upper arms of the delta arm linkages reduce interference between the arm linkages. The inward direction of arm linkage 8 to locate the pivot 16 over the base in many positions of the top plate 12 relative to the base 10, produces a number of interference points and limits the possible positions of the top plate. This disadvantage, relative to conventional delta type robot arms, is offset with the ability for the top plate 12 to extend over an object such as the edge of a table, which is a difficult movement with conventional arm linkage configurations. For example, as shown in FIG. 3, the top plate 12 moves downwardly and arm linkage 8 can extend inwardly such that the edge of a table can be located in the gap between the lower arm 50 and the upper arm 54. Some additional advantages are possible by reversing the orientation of upper and lower arms with respect to the interference and desired movement of the modified delta linkage.

The pivot position of arm 8 to the base preferably is slightly forward of the other two arms. With this arrangement the base can be of reduced size and essentially of a reduced size below arm 8. This allows longer reach as the base can abut an obstacle adjacent arm 8 and the arm can reach over the obstacle. Depending on the application it may be desirable to outwardly angle the pivot axis of the lower arms of the other two linkages as shown in the drawings.

As can be appreciated from a review of FIG. 3, a force applied to the free edge 70 of the mounting plate 12 can be accommodated by pivoting movement of the lower arms of arm linkages 4 and 6 in combination with a pivoting movement of the upper arm of arm linkage 8. In addition, if a force was anticipated, the mounting plate could have moved forwardly and once the force is encountered, start to move rearwardly to partially compensate or smoothly dissipate even a sudden force. This type of anticipating movement may also discourage a collision. For example, a dog anticipating a lunge at the structure may reconsider if movement towards the dog is initiated. This arrangement is advantageous with respect to stability and fast adjustment if necessary to reduce or counteract undesirable forces applied to the mounting plate.

The motors are mounted adjacent the base plate 20, and as such the center of gravity of the robotic structure is lowered. With many robotic structures there is potential for the robot to fall over or topple when subjected to an external force, and therefore it is desirable to have the ability to counteract this possibility. The present arrangement of the arm linkages and the reversal thereof particularly in combination with an omni base drive, allows for faster response and reduces the risk of the robot toppling. As can be appreciated, the unexpected toppling of a robot can create a substantial hazard and should be avoided and/or minimized where possible. The drives for the base are provided in the base for increased stability.

Figure 6:
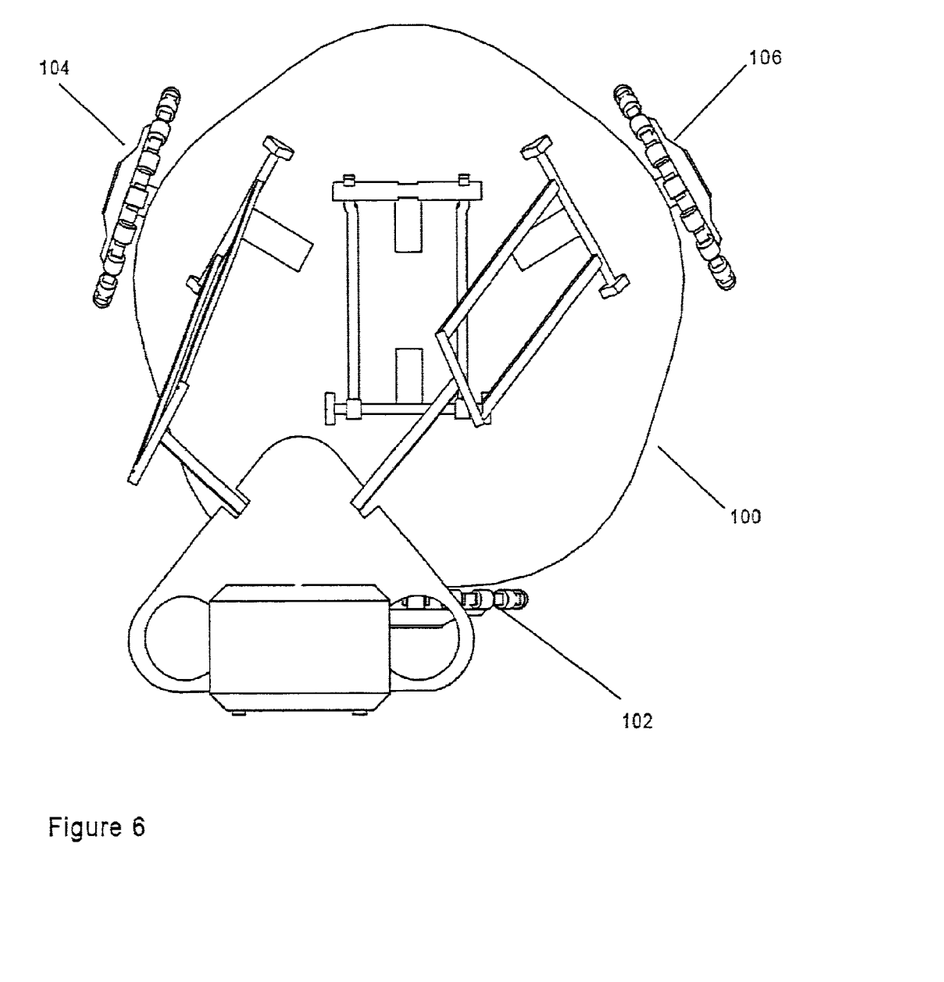
FIG. 6 is a top view of the robot structure of FIG. 5.
Figure 7:
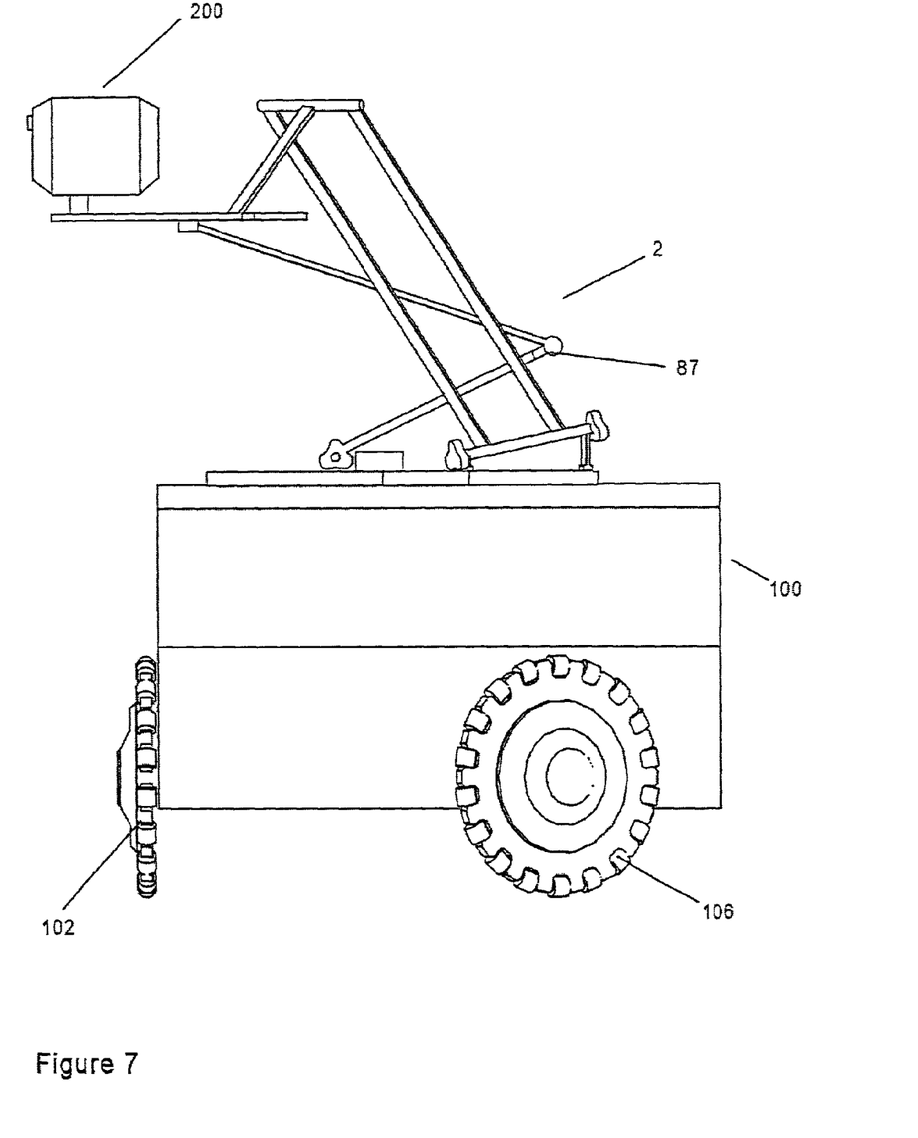
FIG. 7 is a side view of the robot structure of FIG. 5.
Figure 8:
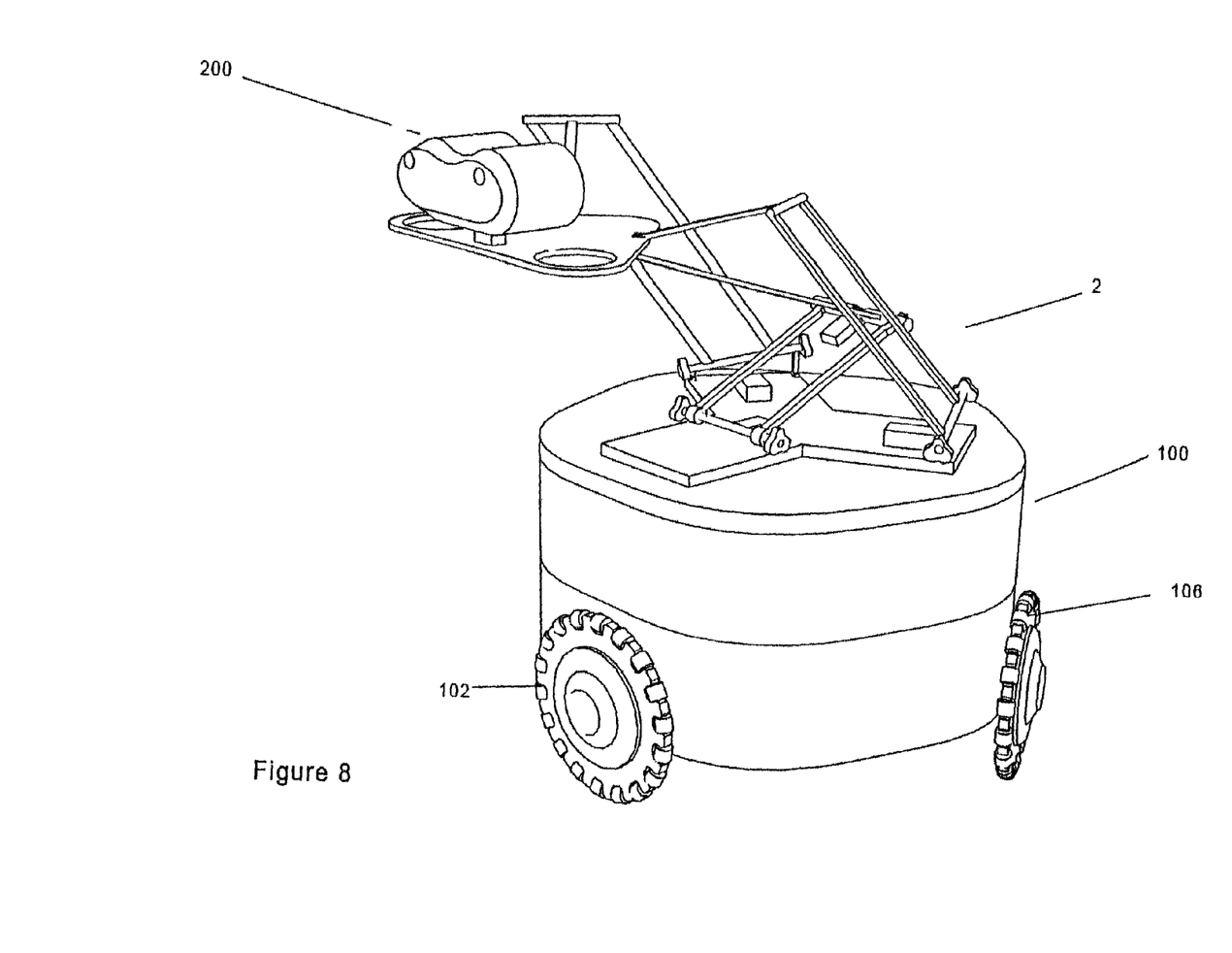
FIG. 8 is a perspective view of the robot of FIG. 5.
Figure 9:
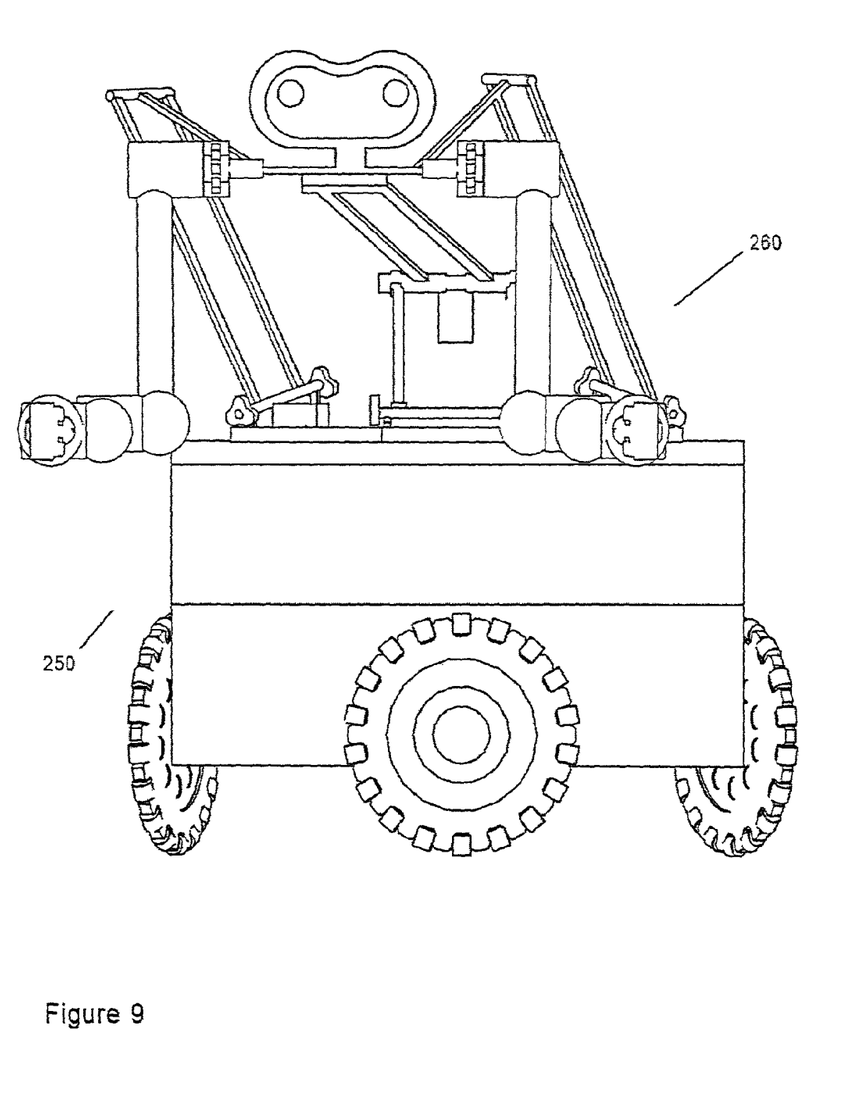
FIG. 9 is a front view of the robot with a pair of actuator arms.
Figure 10:
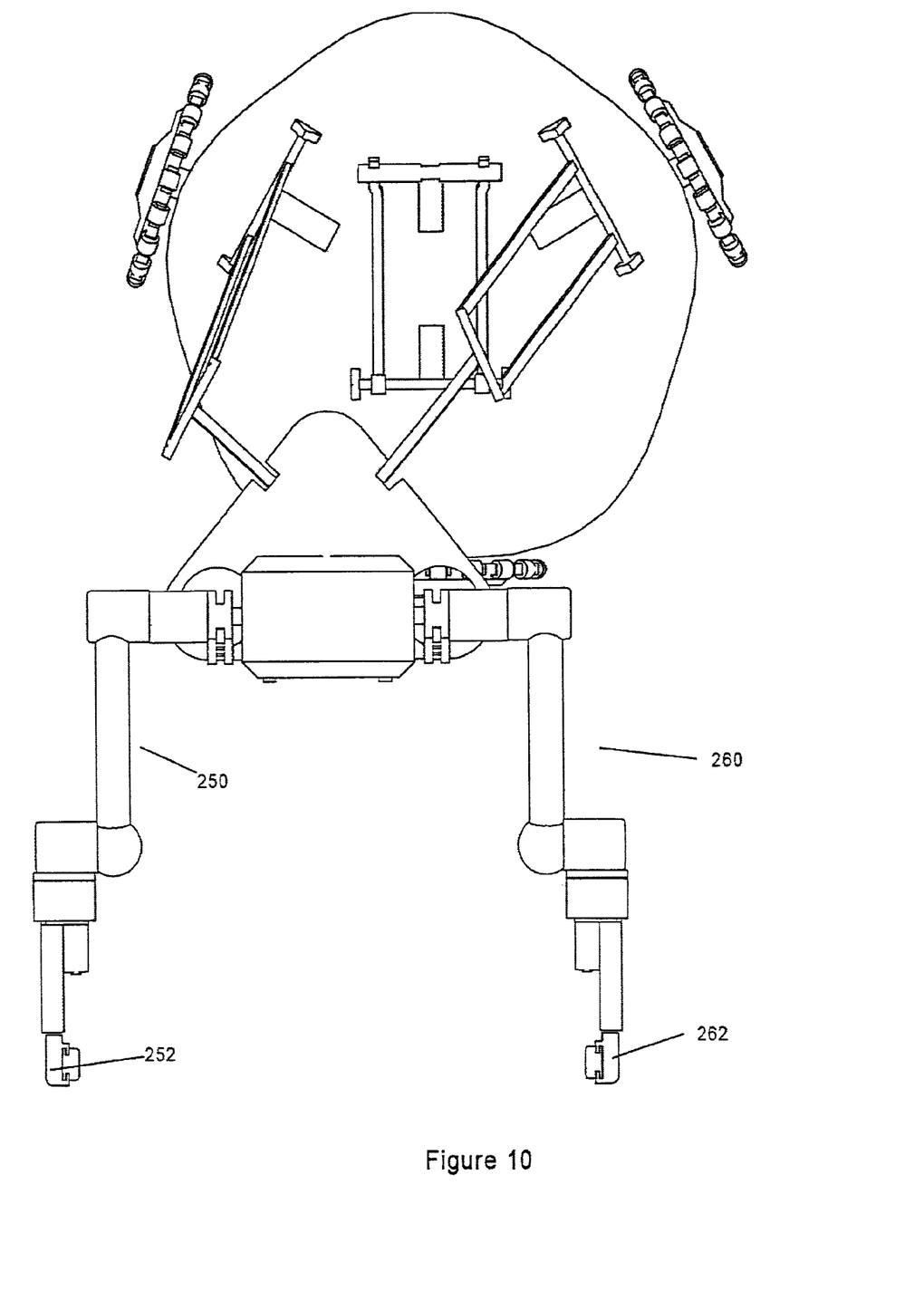
FIG. 10 is a top view of the robot of FIG. 9.
Figure 11:
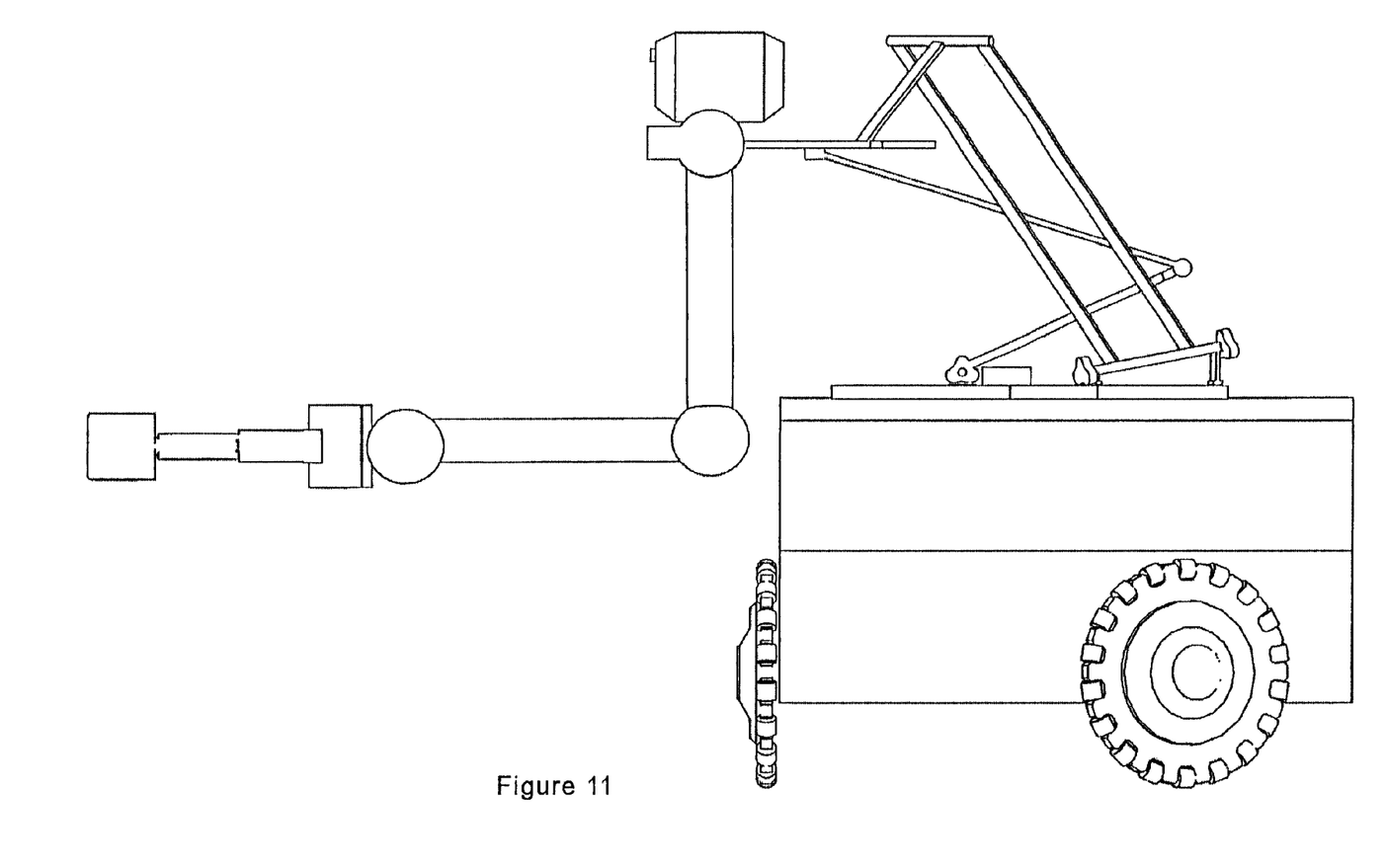
FIG. 11 is a side view of the robot of FIG. 9.
Figure 12:
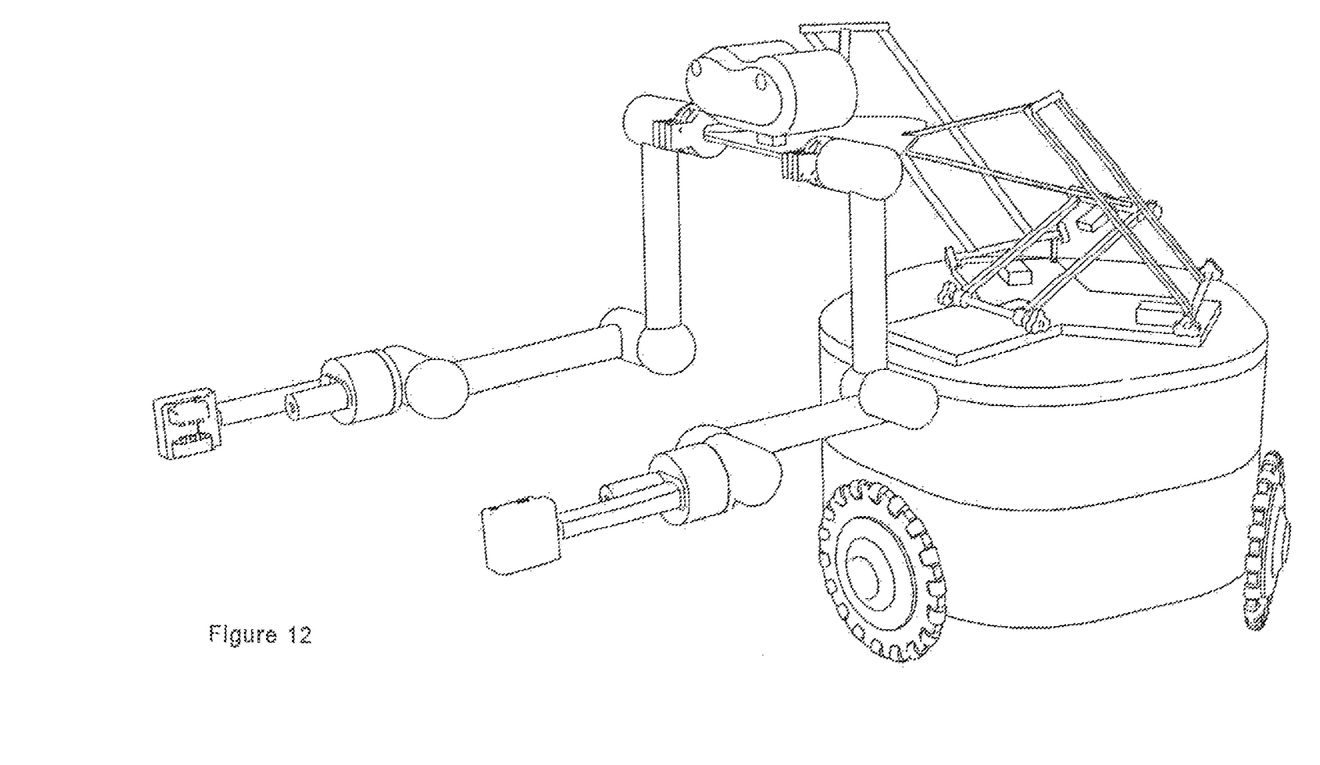
FIG. 12 is a perspective view of the robot of FIG. 9.

The omni wheeled robot 90 includes the omni wheeled base 100 shown with independently driven wheels 102, 104 and 106. Each of these wheels is driven by a separate motor and a controller is used to control the drive of the wheels to produce a desired direction of travel. The omni wheeled base 100 supports the delta robot linkage 2 on the raised surface 108. The delta linkage includes the reverse arm linkage 8 as described in the earlier figures in combination with the outwardly angled arm linkages 4 and 6. The platform 12 supports the head 200 which can be specialized for one or more particular robotic applications. For example, the head 200 is shown with two optical inputs that allow for viewing of the space in which the delta robot is located. Different performance heads can be installed for a particular application. The platform 108 also supports the linkage control motors 81, 83 and 85 and the raised motor 87. As can be appreciated from a review of FIG. 6, the motors are all adjacent the base of the delta linkage 2 and this helps to maintain a low center of gravity. In a further embodiment of the inventions the rotational force applied by raised motor 87 to pivot connection 16 may instead be applied via a chain or belt running parallel with the lower arm 50 enabling motor 87 to also be located on the raised surface 108, further lowering the center of gravity.

As shown in FIGS. 5 through 8, the reverse linkage 8 allows the functioning head 200 and the platform 12 to be appropriately positioned to one side of the omni wheeled base 100. For example, if a top of a table extends into the gap between the omni base 100 and the functioning head 200 as shown in the side view of FIG. 8, the functioning head 200 can essentially extend over the table.

The reverse link introduces some additional restrictions and the need for a fourth drive, however the advantage of this linkage with respect to positioning of the functioning head 200 more than compensates for these design restrictions. As can be appreciated in a traditional delta linkage there may well be interference points to the exterior of the robot and thus the positioning of the head 200 would be limited due to interference with respect to other structures in the environment. The reverse linkage provides additional flexibility and allows appropriate positioning adjacent existing structures that may be in the room. Furthermore, the omni wheeled base allows convenient positioning in combination with the delta robot linkage. Basically the linkage allows fast effective movement of the head 200 through a broad range of positions. The omni wheeled base also allows for accurate movement of the base which further allows for precision movement of the head. This combination of movement can also simplify the programming to achieve a particular movement of the head 200 to a desired location, since control and monitoring of only seven motors (three for the base and four for the delta mechanism) is required as opposed to two or three times as many motors for a humanoid robot.

Further advantages are realized when additional equipment is mounted on the platform 12. For example, in FIGS. 9 through 12 arms 250 and 260 are shown that are generally positioned to one side of the base 100. The combination of the delta linkage and the omni wheel base allows for precision placement of these arms and the arms themselves include a number of different pivoting joints for allowing accurate placement of the engaging members 252 and 262.

A significant problem in introducing robots in different environments is the possible risk or hazard of the structure toppling and injuring an occupant. Typically the robots are of a significant weight and inadvertent movement of the robots can potentially lead to an injury. One of the disadvantages of existing robotic design and devices is the inability to quickly respond to inadvertent forces that may be exerted on the robotic devices.

The omni wheeled base 100 is able to move quickly and in essentially any direction. In this way the omni wheeled base can partially back away from the direction in which a force is being applied. Furthermore the delta linkage is also able to quickly respond to effectively lower the center of gravity and move in a direction to avoid possible collision or to anticipate a collision and take some pre-impact steps to reduce the effect. This ability of both the base and the linkage to quickly respond allows the device to avoid certain collisions and to reduce the effect of other collisions. Furthermore the center of gravity of the robot is inherently relatively low and the ability to withstand such collisions is improved. The linkage can move towards the body that is likely to strike the robot to absorb some of the force initially and then respond to such a force by withdrawing. This type of defensive action may have the advantage of discouraging collisions and/or reducing the effect thereof. It is also possible for this linkage to move to one side to avoid such collision and move rearwardly such that the force is progressively absorbed by the base or a higher component of the force is distributed by the lower base. The combination of the ability of the linkage to move quickly and the base to move quickly provides a cooperative effect to further reduce these potential hazards. Conventional wheeled robots typically only bend in one direction at the waist. An external force suddenly applied from other directions cannot be progressively absorbed resulting in significant structural stress and likely the toppling of the robot.

A further advantage of the modified delta linkage is the substantial range and height that the linkage is able to move through. As can be appreciated the actual mass of the linkage is relatively low and the mass of the base is relatively high. The center of mass moves upwardly if the functioning head 200 is somewhat heavier. In any event, the ability of the linkage to quickly respond to reduce the height thereof (lowering the heavy load) will lower the center of gravity and also reduce any lever effect. Furthermore, the ability to move downwardly and rearwardly again allows for a response much in the manner of a human allowing a pivoting movement of the hips essentially as well as fast movement of the feet to avoid such collisions. In the present robotic design, the delta linkage allows for pivoting of the midsection and the omni wheeled base allows for rapid and evasive movement of the base without the need for humanoid complexities including simulated spine, hip and knee joints. However, the delta linkage described could also be mounted to walking robots where its ability to rapidly shift the center of gravity would also result in more stable robots, particularly those capable of walking on uneven terrains or on stairs. Furthermore, the delta linkage described could be mounted in a two-wheeled base or on a single hopping base.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property of privilege is claimed are defined as follows:

1. A delta-type robot comprising:
   a base;
   a movable top plate for receiving additional equipment to be selectively moved to different elevations and horizontal positions above said base;
   said delta-type robot including three control arm linkages connecting said base to said movable top plate where each control arm linkage includes a lower arm having a pivot connection with an upper arm;
   each lower arm section is pivotally secured to said base and each upper arm section is pivotally secured to said movable top plate;
   two of said control arm linkages have a conventional orientation with the respective pivot connection of the lower and upper arms being located outwardly of the respective pivot securement of the lower arm with said base when said movable plate is in one of a host of positions generally above said base;
   and wherein one of said arms has a reverse orientation with the lower arm extending inwardly into the space above said base with the pivot connection with said upper arm being above said base with said movable plate in one of a host of positions generally above said base.

2. A delta-type robot as claimed in claim 1 wherein said lower arm of said control arm linkage having said reverse orientation is a fixed pivotal arm movable about a pivotal connection with said base.

3. A delta-type robot as claimed in claim 2 wherein said two control arm linkages having an outward orientation each include a further pivot axis perpendicular to the pivot axis securing the lower arm to said base.

4. A delta-type robot as claimed in claim 3 wherein said lower arm of each control arm linkage having an outward orientation includes two spaced parallel arm sections forming part of a parallelogram linkage.

5. A delta-type robot as claimed in claim 4 wherein said control arm linkage of said reverse orientation includes an upper arm having two spaced parallel arm sections pivotally secured to additionally provide pivoting movement in the plane of said two spaced parallel arm sections and forming part of a parallelogram linkage.

6. A delta-type robot as claimed in claim 5 wherein said lower arm of said control arm linkage of said reverse orientation is of a short length relative to the length of each lower arm of said two control arm linkages having an outward orientation.

7. A delta-type robot as claimed in claim 1 wherein the base includes a series of separately driven drive mechanisms cooperating to provide mobility of the base.

8. A delta-type robot as claimed in claim 7 wherein each of said separately driven drive mechanisms is coupled to and drives an omni-wheel.

9. A delta-type robot as claimed in claim 1 wherein the base includes a three-wheeled drive mechanism.

10. A delta-type robot comprising:
a base;
a movable top plate for receiving additional equipment to be selectively moved to different positions above and beyond said base;
said delta-type robot including three control arm linkages connecting said base to said movable top plate where each control arm linkage includes a lower arm having a pivot connection with an upper arm;
each lower arm is pivotally secured to said base and each upper arm is pivotally secured to said movable top plate;
two of said control arm linkages have an outward orientation with the lower arms extending outwardly away from the respective pivot connection of the lower arm and the base when said movable top plate is generally centered above said base;
and wherein one of said control arms has a reverse orientation with the lower arm section extending inwardly into the space above said base when said movable top plate is generally centered above said base.

11. A delta-type robot as claimed in claim 10 wherein said lower arm of said control arm linkage having said reverse orientation is a fixed pivotal arm movable about a pivotal connection with said base.

12. A delta-type robot as claimed in claim 11 wherein said two control arm linkages having an outward orientation each include a further pivot axis perpendicular to the pivot axis securing the lower arm to said base.

13. A delta-type robot as claimed in claim 12 wherein said lower arm of each control arm linkage having an outward orientation includes two spaced parallel arm sections forming part of a parallelogram linkage.

14. A delta-type robot as claimed in claim 13 wherein said control arm linkage of said reverse orientation includes an upper arm having two spaced parallel arm sections pivotally secured to additionally provide pivoting movement in the plane of said two spaced parallel arm sections and forming part of a parallelogram linkage.

15. A delta-type robot as claimed in claim 14 wherein said lower arm of said control arm linkage of said reverse orientation is of a short length relative to the length of each lower arm of said two control arm linkages having an outward orientation.

16. A delta-type robot as claimed in claim 10 wherein the base includes a series of separately driven drive mechanisms cooperating to provide mobility of the base.

17. A delta-type robot as claimed in claim 16 wherein each of said separately driven drive mechanisms is coupled to and drives an omni-wheel.

\* \* \* \* \*